US005235954A

United States Patent [19]

Sverdlin

[11] Patent Number: 5,235,954

[45] Date of Patent: Aug. 17, 1993

[54] INTEGRATED AUTOMATED FUEL SYSTEM FOR INTERNAL COMBUSTION ENGINES

[76] Inventor: Anatoly Sverdlin, 1847 Raintree Cir., Seabrook, Tex. 77586

[21] Appl. No.: 911,117

[22] Filed: Jul. 9, 1992

[51] Int. Cl.[5] ........................ F16K 31/02; F02M 37/04

[52] U.S. Cl. .................................... 123/447; 123/467; 251/129.09

[58] Field of Search ............... 123/446, 447, 467, 500, 123/501, 179.16, 179.17, 497; 251/129.09, 129.01; 137/807

[56] References Cited

U.S. PATENT DOCUMENTS

| | | | |
|---|---|---|---|
| 4,069,800 | 1/1978 | Kanda et al. . | |
| 4,170,974 | 10/1979 | Kopse et al. . | |
| 4,219,154 | 8/1980 | Luscomb | 123/472 |
| 4,249,497 | 2/1981 | Eheim et al. . | |
| 4,342,443 | 8/1982 | Wakeman | 251/129.09 |
| 4,359,032 | 11/1982 | Ohie . | |
| 4,407,250 | 10/1983 | Eheim et al. | 123/467 |
| 4,440,132 | 4/1984 | Terada et al. | 123/467 |
| 4,459,959 | 7/1984 | Terada et al. . | |
| 4,546,955 | 10/1985 | Beyer et al. | 251/129.01 |
| 4,603,671 | 8/1986 | Yoshinaga et al. | 123/467 |
| 4,628,881 | 12/1986 | Beck et al. | 123/501 |
| 4,667,638 | 5/1987 | Igashira et al. | 123/179.17 |
| 4,784,101 | 11/1988 | Iwanaga | 123/467 |
| 4,834,055 | 5/1989 | Steiger | 123/447 |
| 4,838,231 | 6/1989 | Ganser | 123/447 |
| 4,884,545 | 12/1989 | Mathis | 123/447 |
| 4,911,127 | 3/1990 | Perr | 123/447 |
| 4,947,895 | 8/1990 | Lillicrap | 137/807 |
| 4,957,084 | 9/1990 | Kramer et al. | 123/447 |
| 4,957,085 | 9/1990 | Sverdlin | 123/467 |
| 5,012,786 | 5/1991 | Voss | 123/467 |
| 5,044,344 | 9/1991 | Tuckey | 123/497 |
| 5,058,557 | 10/1991 | Frank et al. | 123/497 |
| 5,085,193 | 2/1992 | Morikawa | 123/497 |
| 5,092,302 | 3/1992 | Mohan | 123/497 |
| 5,121,730 | 6/1992 | Ausman et al. | 123/467 |
| 5,141,164 | 8/1992 | Ohno et al. | 251/129.01 |

OTHER PUBLICATIONS

SAE International SP-848 Entitled "Electronic Engine Controls Design", Development, Performance (Feb. 1991).

Paper Entitled "Variable Pressure Dual-Mode Fluid Controlled Injection System" Presented Apr. 1991 by A. Sverdlin at 19th CIMAC.

(List continued on next page.)

*Primary Examiner*—Willis R. Wolfe
*Assistant Examiner*—Thomas Moulis
*Attorney, Agent, or Firm*—Pravel, Hewitt, Kimball & Krieger

[57] ABSTRACT

An automated fuel injection system for a multi-cylinder internal combustion engine in which an engine digital control (EDG) receives input signals from several monitoring subsystems A-G (FIG. 4) each of which monitors a predetermined area of engine operation. The engine digital control (EDG) formulates appropriate output signals in response to the monitoring subsystems for sending by microprocessor (78) to fuel injectors (10) for control of pressurized fuel injected in the associated cylinders. Pressurized fuel is supplied by a non-engine driven pump (72) when the engine is stopped to the recirculation of fuel through the fuel injectors (10) and an engine driven pump (116) is provided to supply pressurized fuel during continuous engine operation. A pressurized magnetic control fluid is supplied by a non-engine driven pump (98) when the engine is stopped and supplied by an engine driven pump 122 during continuous operation of the engine. The fuel injector (10) has a fuel injection valve (50) and a fuel injection control valve (38) to control the flow of pressurized fuel to discharge orifices (20). Electronically controlled fluid pressure regulators (76, 118) for the pressurized fuel and electronically controlled fluid pressure regulators (112) for the magnetic control fluid are actuated by output signals from the microprocessor (78). Magnetic coils (63, 64) for valves (38, 50) are also electronically controlled by output signals from microprocessor (78) of the engine digital control (EDG).

79 Claims, 3 Drawing Sheets

OTHER PUBLICATIONS

Paper Entitled "CDS-An Advanced Electronic Control System for Diesel Engine Management" Presented Apr. 1991 by R. Schulmeister et al at 19th CIMAC.

Paper Entitled "Development of Electronically Controlled Two Stroke Diesel Engine" Presented Apr. 1991 by Y. Kirayama et al at 19th CIMAC.

Paper Entitled "Research and Development of Electrically Controlled and of New Material Applied Fuel Injection System for Large Marine Slow Speed Diesel Engine" Presented Apr. 1991 By T. Imahashi et al at 19th CIMAC.

Paper Entitled "Dual Mode Fluid Controlled Fuel Injection System for Internal Combustion Engines" Presented Mar. 1990 by A. Sverdlin at International Conference.

INTEGRATED AUTOMATED FUEL SYSTEM FOR INTERNAL COMBUSTION ENGINES

FIELD OF THE INVENTION

This invention relates generally to an integrated automated fuel system for internal combustion engines, and more particularly to such a fuel system responsive to sensed variable engine operating parameters.

BACKGROUND OF THE INVENTION

In the past two decades diesel engines have increased power output per cylinder two to three times, but fuel injection systems which require very precise tuning and reliability have remained practically unchanged. The traditional design of the fuel system of such diesel engines includes engine driven fuel pumps, individual plunger-type fuel pumps, fuel injectors, and different types of governors. Lately designers and manufacturers of diesel engines, particularly marine diesel engines, have tried to introduce different types of "electronic" controls to existing conventional injection systems, such as camshaft driven unit injector with electronically on-off controlled solenoid valves, or providing hydraulic actuators for conventional plunger-type fuel pumps. However, these recent improved fuel systems for diesel engines are more complicated, less controllable, unreliable, and uneconomical than heretofore. Practically, when the operating condition of the fuel pumps in these fuel systems is changed due to cam, plunger or valve wear, the injection process becomes difficult to control regardless of the type of the associated electronic control. Each cylinder of the engine with this kind of injection system acts as an individual engine. With this arrangement it is difficult to balance power distribution between cylinders. In multi-cylinder engines the power distribution between cylinders becomes uncontrollable which causes overloading of some cylinders and underloading of others. This results in failure of pistons, bearings, crankshaft, and other major engine parts and increased exhaust emissions. Variable injection time (VIT) devices using existing VIT controls to individual cylinders do not properly react to load and ambient conditions of various engine operations.

No engine or fuel injection equipment manufacturer heretofore has attempted to directly control automatically the load sharing between individual cylinders, emission quality, and other major operating engine parameters. An electronically controlled functional algorithm or formula based on on-off principles cannot adequately react and govern existing conventional types of fuel injection systems. The very short time, only a few milliseconds, available for injection in diesel engines and the very high injection pressure, 1,000–2,000 bars, do not permit the utilization of a responsive and reliable system based on the principles of conventional injection system elements. Fuel injection systems based on a crankshaft-camshaft drive and camshaft actuate fuel pumps are dynamically and hydraulically unresponsive, cannot be properly controlled, and react to changes which occur as a result of different load and ambient conditions during engine operation.

Other attempts to solve the problems associated with a fuel injection system operated from a crankshaft-camshaft drive have included a pilot injection system with two fuel injectors with different settings, or a complicated pre-injection pump arrangement. Both the pilot or pre-injection pump concept approaches have disadvantages since the high injection pressure (1,000–2,000 bars) controls helixes on the plungers and associated valves deteriorate due to cavitation. Conventional fuel injectors, by method of operation, are direct-acting relief valves. They operate on differential forces between fuel supply pressure and mechanical spring. In conventional fuel injection systems the load distribution between individual cylinders is uncontrollable. The failure of an individual fuel pump or fuel injector and related equipment on a multi-cylinder engine reduces the power of the engine which had been generated by the failed cylinder. The load which has been lost from the failed cylinder is distributed between the remaining normally operating cylinders. This causes uneven load distribution and overload to the entire engine which is created by variable speed governors. Variable speed governors, as analog devices, serve the purpose of maintaining a constant speed. So, in reaction to the failure of a single cylinder, variable speed governors increase fuel supply to the remaining operating cylinder causing overload and increasing torsional vibration and emissions of the engine. The disadvantages of such fuel systems have been proven over many years by different engine manufacturers and fuel systems based on these principles are usually complicated, relatively unreliable and expensive.

U.S. Pat. No. 4,957,085 dated Sep. 18, 1990 disclosed a fuel injection system in which a separate pressurized control fluid is utilized which is in fluid communication with a fuel injection valve to control fuel flow to the injector ports. However, the pumps for the fuel and the control fluid are driven by a cam on the engine camshaft. Also, there is no separate flow control member controlling the flow of fuel to the fuel injector valve upstream of the fuel injector valve. Fuel timing and fuel quantity are controlled by a camshaft driven fuel pump even though the fuel injector valve is subjected to a fluid pressure differential between pressurized control fluid and pressurized fuel.

SUMMARY OF THE INVENTION

The present method for injecting fuel is based on an entirely different physical and operating principle than the conventional fuel injection-starting system. It does not require a crankshaft-camshaft drive, high pressure, cycling, fuel pumps, mechanically operated, air or other type of starting distribution and related components for each individual cylinder. The fuel system of the present invention preferably includes a magnetohydrodynamic (hereinafter sometimes referred to as "MHD") fuel injection system and includes a continuously rotating, non-cycling, variable, pressure fuel pump with only a single fuel pump being required for an engine instead of a fuel pump for each cylinder as normal heretofore. The pressure-current modulated MHD fuel injection controls fuel quantity, timing and other predetermined engine parameters. Thus, the MHD fuel injector serves as the single distribution and control element of the fuel system. The pressure-current modulated MHD fuel injector of the present invention is electronically controlled to exploit MHD effects of magnetic fluids by an engine digital governor (EDG) system which is responsive to the following predetermined engine operating functions when utilized with a marine diesel engine for a ship, for example.

| | |
|---|---|
| (1) | Variable Injection Pressure |
| (2) | Variable Injection Timing |
| (3) | Injection Duration Timing |
| (4) | Fuel Quantity |
| (5) | Pilot Injection Timing |
| (6) | Pilot Pressure Timing |
| (7) | Pilot Duration Timing |
| (8) | Pilot Fuel Quantity |
| (9) | Engine Start Ahead |
| (10) | Engine Reverse Astern |
| (11) | Engine Start Astern |
| (12) | Engine Reverse Ahead |
| (13) | Normal Start |
| (14) | Dynamic Start |
| (15) | Cylinder Oil Quantity |
| (16) | Air-Fuel Ratio |
| (17) | Variable Valve Timing |
| (18) | Variable Valve Stroke |
| (19) | Engine Combustion Sequence |

The pressure-current modulated MHD fuel injectors may be heated up when the engine stops by fuel recirculation and cooled by fuel during MHD injector operation. Thus, the MHD fuel injectors do not require an additional cooling system as conventional fuel injection systems heretofore have required.

Fuel timing and fuel quantity have been controlled heretofore by conventional engine driven fuel pumps. The pressure modulated MHD fuel injection valve and MHD fuel injection control valve of the present invention operating under the same variable control magnetic fluid pressure-current are controlled by an electronic pressure-current modulator utilizing magnetohydrodynamic physical capabilities such as hydrodynamic sealing to create a high tension effect. Magnetic fluids with modulated pressure-current operating modes permit creation of a positive hydraulic seal. The high tension effect of the magnetic fluid between the injection valves and adjacent guides created a lubricating field and center the valves inside the guides. Simultaneously, pressure-current modulated signals act as a control force for the magnetohydrodynamic fuel injection system. The magnetohydrodynamic effect of the magnetic fluid performs control operating functions of the MHD injection valves.

Magnetic Fluids

A ferromagnetic substance in fluidity is generally called "magnetic fluid" or "magnetic liquid". Ordinary ferromagnetic substances are alloys or compounds of iron, nickel, or cobalt, for example, which are all solids. Magnetic fluid is the only ferromagnetic substance in fluidity. Magnetic particles are made of ferrite and are extremely small in size. Electron microscopy of ferrite particles shows that their shape is nearly spherical with the diameter ranging from 70 to 150 Å ($1\ Å = 10^{-8}$ cm). There are many substances that display ferromagnetism, such as magnetites or manganese zinc ferrites.

A magnetic fluid based on oil, for example, includes a surfactant acting as a mediator between magnetic particles and the base oil, since the molecular structure of the surfactant contains hydrophilic groups and lipophilic groups. The hydrophilic groups adhere to the surface of hydrophilic magnetic particles (chemical absorption), and the lipophilic groups are dissolved in the oil around them. In this way, the surfactant acts to prevent the precipitation and separation of magnetic particles by going between the magnetic particles and the base oil which are originally incompatible with each other. This accounts for the reason that magnetic particles with a density of about 5 g/cm$^3$ remain semi-permanently dispersed in the solvent with a density of about 1 g/cm$^3$.

Behavior Of Magnetic Fluid In Magnetic Field Magnetization

The magnetic particles in magnetic fluid are minute magnets themselves. However, the magnetic fluid as a whole shows no sign of magnetization since each particle stays in disorder affected by the thermal motion in a state where there is no magnetic field.

When magnetic fluid is put in a magnetic field, the minute magnets of magnetic particles in the fluid are oriented in accordance with the direction of the magnetic field. The degree of orientation varies according to the intensity of the magnetic field: if magnetic field is strengthened, the particles are better oriented and show greater magnetization. Once the orientation of the minute magnets is completed, the magnetization does not proceed any more even if the magnetic field is further strengthened. Such as state of magnetization is called saturated magnetization.

The relation between the magnetic field and the magnetization of magnetic fluid is compared to that of an ordinary ferromagnetic substance such as iron. The magnetization capability of magnetic fluid with an increase of magnetic field starts at a minimum point and reaches its saturation point. When the magnetic field reaches the maximum point, a decrease in the magnetic field returns the magnetization to a minimum point following the same curve adversely. If the magnetic field is provided in the adverse direction, magnetization reaches it saturation point when the magnetic field reaches the maximum point. If this process is repeated, magnetism will follow the same curve forward and backward.

The magnetization of ordinary ferromagnetic substances with an increase of the magnetic field from a zero point, traces a curve and reaches its saturation point when the magnetic field reaches maximum. Even if the magnetic field is weakened, however, magnetization does not return to the starting point following the same curve backward but traces a curve with some magnetization remaining when the magnetic field is reduced to zero. This magnetization is referred to as residual magnetization. For the reduction of residual magnetization to zero, the adverse magnetic field is required and is referred to as coercive force. If further adverse magnetic field is provided, magnetization reaches its saturation when the magnetic field reaches maximum. With a reduction of the magnetic field to the original direction, magnetization returns the curve to the starting point. The magnetization of ordinary ferromagnetic substances does not transcribe a single curve but transcribes a loop, unlike the magnetization of magnetic fluid which transcribes a single curve.

A substance or material which transcribes a wide loop with large residual magnetization and coercive force is suitable as the material for permanent magnets (hard magnetic materials). A substance which traces a narrow loop with little residual magnetization and coercive force is suitable as the material for iron core of transformers (soft magnetic materials). Magnetism as shown by magnetic fluid is called "super paramagnetism".

Magnetization Phenomena

The apparent density of magnetic fluid changes the magnetic field. The relation between the apparent density and the grade of the magnetic field is shown by the following formula.

$$Sd = Se + \frac{M}{4\pi g} \cdot GradH$$

Where:

Sd: Apparent density

Se: True density of magnetic field

M: Magnetization of magnetic fluid

GradH: Gradient of magnetic field g: Acceleration of gravity

Magnetic fluid with a density of 1.30 g/cm$^3$ and a saturated magnetization of 400 Gauss is given 100 Oersted/cm of magnetic field gradient, and the apparent density of the magnetic fluid is 4.55 g/cm$^3$. Therefore, a non-magnetic material with a density of 4.0 g/cm$^3$ precipitating in magnetic fluid will surface if it is given the grade of magnetic field.

Viscosity Change Caused By Magnetization

The viscosity of magnetic fluids increases with the intensification of magnetization and may increase fivefold to sixfold at the maximum. For the above described reasons the physical capabilities of MHD effects of magnetic fluids are utilized in the present invention to create positive seals between needle valves and associated guides while exploiting the conductive capabilities of magnetic fluids to provide control systems without any movable mechanical elements.

This invention may be utilized with two and four stroke slow, medium and high speed diesel engines. It operates with conventional distilled-type diesel fuel and with residual fuels up to 4 7,500° $R_e$ scale 1 with 6% or more sulphur and 50% water. It is possible to operate under severe operating conditions as the fuel injection control valve and the fuel injection valve operate with a fluid seal, created by the high fluid tension effect as described in aforementioned U.S. Pat. No. 4,957,085.

The present invention is directed to a MHD fuel injection system for an internal combustion engine which operates in response to elected sensed engine operating parameters and is adapted to operate selectively without any type of crankshaft-camshaft actuated fuel distribution pump. The MHD fuel injection system includes a MHD fuel injector having a fuel injection control valve in fluid communication with pressurized fuel and in magnetic fluid communication with a separate pressurized control magnetic fluid. A separate magnetic fluid source is provided for the separate pressurized control magnetic fluid source including a control magnetic fluid pump which is responsive to sensed operating parameters of the internal combustion engine. A separate MHD fuel injector control valve for the MHD fuel injector valve is provided and is phased for opening prior to the opening of the fuel injection valve to permit fuel flow to the MHD fuel injection valve and for closing prior to closing of the fuel injection valve for blocking fuel flow to the fuel injection valve. Both the fuel injection valve and the fuel injection control valve are responsive to pressurized fuel and pressurized control magnetic fluid and are actuated upon a predetermined pressure and current potential differentials between the pressurized fuel and the pressurized control magnetic fluid. The fuel may be recirculated continuously within the injector for heating the MHD fuel injector when fuel is not being injected into a cylinder of the engine. The quantity of fuel, injection timing, duration valve timing, stroke, starting sequence and other predetermined operating engine parameters are continuously monitored, sensed, and controlled during the combustion process through an engine digital governor or control (EDG). Modulated variable electronic signals from a microprocessor of the engine digital control to pressure regulators for the fuel and the control magnetic fluid control the pressure-current differential between pressurized fuel and pressurized control magnetic fluid and provide an intermediate level of control over the opening and closing of the MHD fuel injection valve for supplying fuel to the discharge ports and cylinder. The pressurized control magnetic fluid is supplied by a pump.

It is an object of this invention to provide an integrated automated fuel system for an internal combustion engine which does not require a separate fuel pump for each cylinder and utilizes a non-engine driven fuel pump not associated with a crankshaft or camshaft drive.

Another object is to provide a single integrated control system for supplying fuel to an internal combustion engine which integrates fuel, starting, distribution, and control subsystems thereby eliminating any separate control systems for starting and reversing.

It is another object of this invention to provide such an integrated control fuel system for an internal combustion engine which is responsive to sensed predetermined engine operating parameters, and utilizes a separate pressurized control fluid responsive to output signals resulting from the sensed parameters.

Another object of this invention is the provision of a fuel injection system having variable force control means utilizing a pressurized magnetic control fluid to control the flow of pressurized fuel to a fuel injection valve of the fuel injector for the discharge of fuel into a cylinder.

A further object is the provision of a separate fuel injection control valve for the fuel injection system of this invention which is responsive to a pressurized control fluid having a varying fluid pressure controlled by an output current signal from a microprocessor receiving input signals from sensors for predetermined engine operating conditions or functions.

Another object is the provision of a magnetohydrodynamic (MHD) fuel injection system including a fuel injector and a fuel injection control valve responsive to a predetermined force differential between pressurized fuel and pressurized magnetic control fluid for controlling the flow of fuel to a fuel injection valve of the fuel injector.

Other objects, advantages, and features of this invention will be in part apparent and in part pointed out hereinafter in the following description and drawings.

DESCRIPTION OF THE INVENTION

Figure 3:
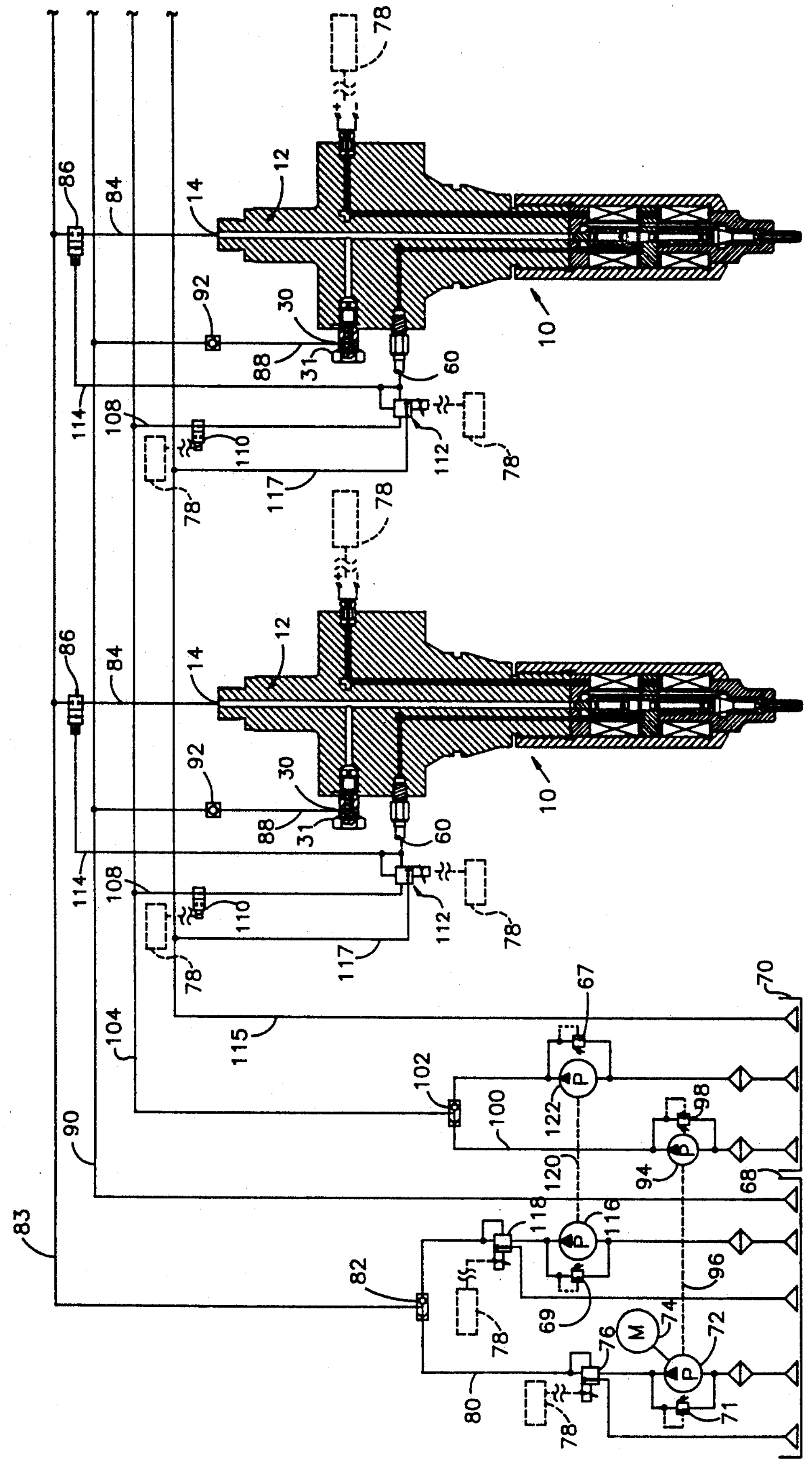
FIG. 3 is a schematic of the fuel injection system of this invention for a multi-cylinder engine and utilizing the fuel injector shown in FIGS. 1 and 2.
Figure 4:
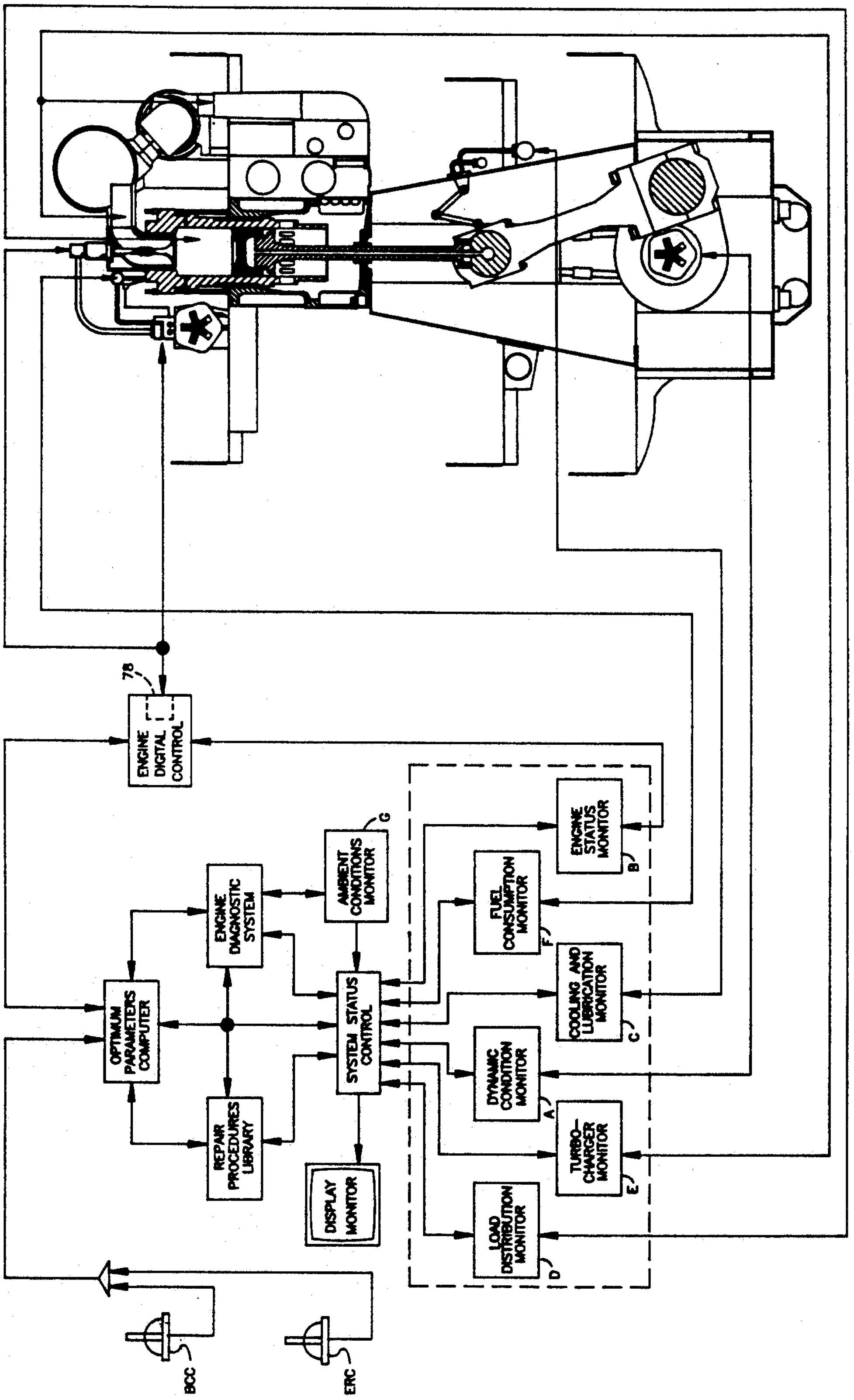
FIG. 4 is a schematic of the integrated diesel engine automated system, for monitoring and sensing predetermined engine operating conditions and providing optimum output signals to the fuel injection system shown in FIG. 3.

The present invention is particularly directed to an integrated diesel engine automated system based on a magnetohydrodynamic (MHD) fuel injection system for a multi-cylinder internal combustion engine which utilizes a separate pressurized control magnetic fluid for controlling the injection of the pressurized fuel into a cylinder of the engine for combustion. A preferred embodiment of a MHD fuel injection system of the invention is shown in FIGS. 3 and 4 and a specific embodiment of a MHD fuel injector for the MHD fuel injection system is shown in FIGS. 1 and 2.

Figure 1:
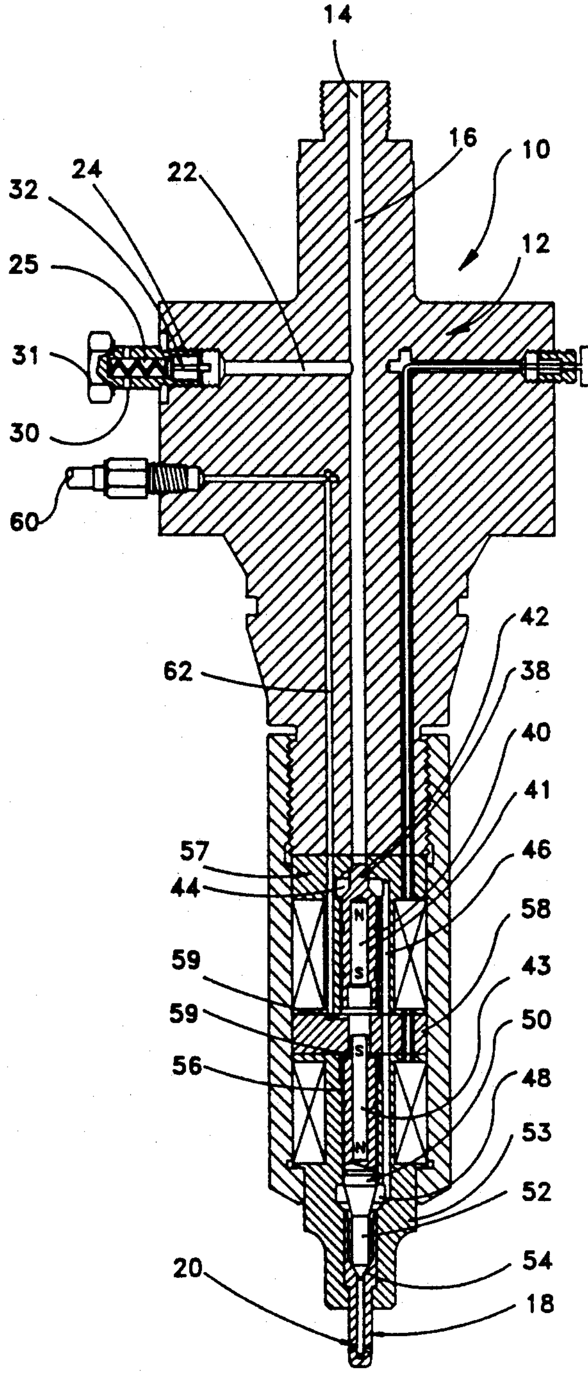
FIG. 1 is a longitudinal sectional view of a fuel injector utilized with the fuel injection system of this invention.
Figure 2:
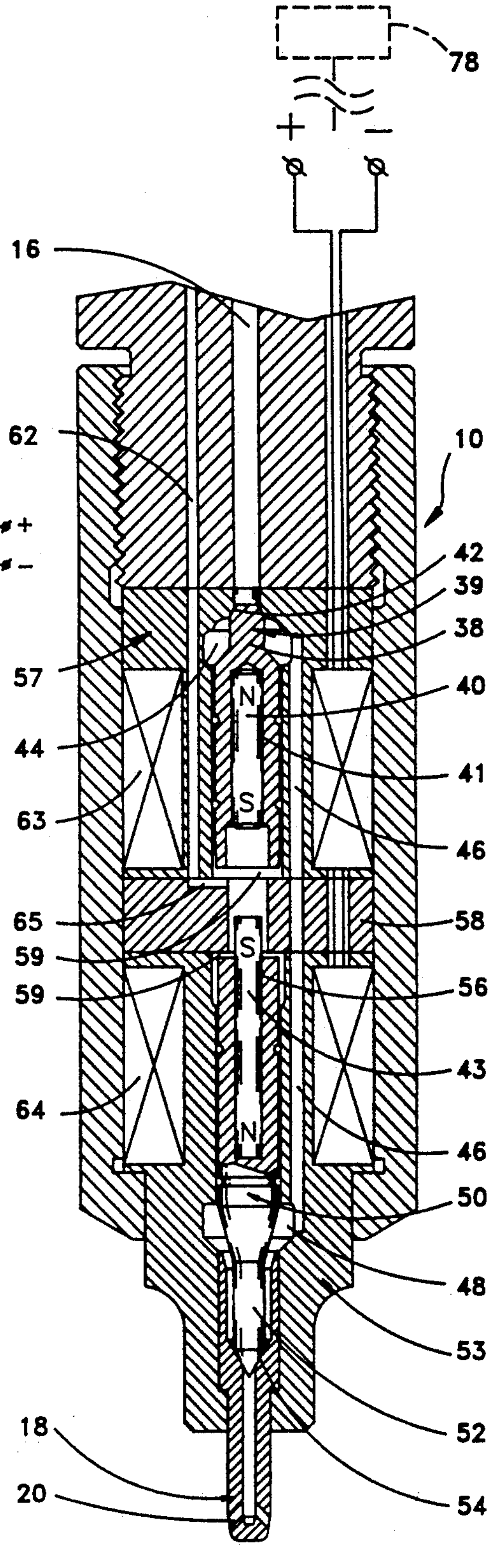
FIG. 2 is an enlarged fragmentary view of the fuel injector shown in FIG. 1 with the fuel injection valve and the fuel injection control valve shown in closed position.

Referring now particularly to FIGS. 1-2, MHD fuel injector 10 has an elongate body generally indicated at 12 having an inlet port 14 at one end of body 12 for an axial fuel passage 16 for pressurized fuel. The other end of body 12 has a fuel discharge nozzle 18 with discharge ports 20 therein for the discharge of fuel into an associated cylinder. The pressurized fuel is continuously recirculated through a recirculation valve generally indicated at 32 in fluid communication with port 22 from fuel passage 16 when not being discharged into the cylinder. Recirculation valve 32 has a valve body 31 and a valve member therein urged by a spring 25 to the right as viewed in FIG. 1. A slot 24 in the valve member extends in a longitudinal direction and provides a clearance between the valve member and body 31. Valve body 31 has outlet ports 30 therein in fluid communication with return line 88 as shown in FIG. 3. With the valve member in the position of FIG. 1, fuel from port 22 flows through slot 24 and outlet ports 30 to recirculation return line 88 as shown in FIG. 3. Upon an increase in pressure of the pressurized fuel in fuel passage 16 sufficient to overcome the bias of spring 25, the valve member of recirculation valve 32 moves to the left as viewed in FIG. 1 to block slot 24 and the flow of fuel through recirculation valve 32.

Fuel injector body 12 includes a lower fuel injection valve body 53 and an intermediate fuel injection control valve body 57. A fuel injection control needle valve shown generally at 38 is mounted within a central bore in fuel injection control valve body 57 for guided movement and has a needle end 39 urged by a permanent magnet bar 40 toward a seated position on frusto-conical seat 42. Control valve 38 has a central bore 41 which receives a permanent magnet bar 40. An intermediate fuel chamber 44 is provided adjacent the needle end 39 of fuel injection control valve 38. Upon opening of control valve 38, fuel flow to intermediate chamber 44 and intermediate fuel passage 46 to a lower fuel chamber 48. While only one fuel passage 46 is shown in FIG. 2 between fuel chambers 44 and 48, a plurality of fuel passages 46 are provided, preferably either four or six fuel passages 46.

A fuel injection needle valve shown generally at 50 is mounted within a central bore in fuel injection valve body 53 for guided movement and has a lower needle end 52 adapted to seat on frusto-conical seat 54 to control fuel flow to nozzle 18. Fuel injection valve 50 has a central bore 56 receiving the permanent magnetic bar 43. Magnetic or magnet bar 43 urges fuel injection valve 50 toward seated closed position on seat 54 because magnet bar 43 is oriented by the same polarity as magnet bar 40 of valve 38 such as south-south (north-north) as denoted in FIG. 2, and magnetic bars 40, 43 normally would be urged away from each. A stop plate 58 for fuel injection valve 50 and injection control valve 38 has stops 59 to limit the movement of control valve 38 and fuel injection valve 50 in an open position.

A separate pressurized control magnetic fluid is provided through a magnetic fluid inlet port 60 and control magnetic fluid passage 62 to urge continuously fuel injection valve 50 and fuel injection control valve 38 toward seated closed positions. Control valve 38 and fuel injection valve 50 are opened at a predetermined pressure-current differential between the pressurized fuel and the pressurized control magnetic fluid and against electromagnetic force created by electromagnetic coils 63 and 64. Pressurized control fluid is provided through port 65 in stop plate 58 of control valve 38 and fuel injection valve 50 to urge control valve 38 and fuel injection valve 50 toward seated closed positions against the urging of the pressurized fuel in an opposite direction. The pressure-current of the pressurized control magnetic fluid is modulated and varied continuously from output pressure-current signals from a microprocessor 78 responsive to monitors and sensors for sensing predetermined engine operating conditions as will be explained further hereinafter. The opening and closing of control valve 38 and fuel injection valve 50 are in separate phases or stages having a time interval therebetween with control valve 38 opening first and followed by the opening of fuel injection valve 50. Likewise, control valve 38 closes first followed by the closing of fuel injection valve 50.

Referring now particularly to FIG. 3, a schematic of the fuel injection system of this invention utilizing pressurized fuel and a separate pressurized control magnetic fluid is illustrated. A fuel reservoir or storage tank is shown at 68 and a separate reservoir or storage tank for the control magnetic fluid is shown at 70. An auxiliary fuel pump 72 is driven by a separate hydraulic or electric motor 74 independently of the internal combustion engine to supply fuel from tank 68 under a predetermined recirculation pressure such as 8-10 bars which pressure is predetermined by electronically controlled fuel pressure regulating valve 76. An output signal from a microprocessor shown schematically at 78 controls the fuel pressure and fuel from auxiliary fuel pump 72 passes through line 80 to shuttle valve 82 and then through manifold fuel supply line 83 and branch line 84. Fuel from branch line 84 passes through a normally closed, emergency shutdown valve 86 to inlet 14 for fuel passage 16 in fuel injector 10. Valve 86 is held in open position by pressurized control magnetic fluid as will be explained further. Manifold fuel line 83 supplies fuel for a plurality of fuel injectors 10 for the multi-cylinder engine with each cylinder having a fuel injector 10.

The fuel recirculation pressure of 8-10 bars passes from fuel passage 16 through open recirculation valve member 32, and port 22 to annular chamber 24 and outlet 30 for return to fuel tank 68 through branch return line 88 and main fuel return line 90. A check valve 92 in branch line 88 prevents any return flow of fuel from main return line 90. Thus, recirculating fuel passes through check valve 92 to return line 90 and fuel storage tank 68. In this condition, preheated heavy fuel continuously circulates in a loop to prevent solidification of heavy fuel in fuel supply line 83, fuel injector 10, and fuel return line 90 to fuel supply tank 68. During the recirculation mode the externally driven high pressure main fuel pump 72 is driven from hydraulic motor 74. Pump 72 may be driven by other external drive means such as an electric motor, if desired. During recirculation mode, an electronic output signal from microprocessor 78 to the variable electronic fuel pressure control valve 76 maintains pressure from fuel pump 72 to shuttle valve 82 at a predetermined pressure such as 8–10 bars.

An auxiliary control magnetic fluid pump 94 is driven externally from a shaft 96 from fuel pump 72 and supplies control magnetic fluid from a control magnetic fluid tank or reservoir 70. The maximum control fluid pressure is predetermined by a relief valve 98 and control magnetic fluid flows through line 100 and shuttle valve 102 to main control magnetic fluid supply line 104 and branch control magnetic fluid line 108 to a normally open solenoid shutdown valve 110. Control magnetic fluid then passes from normally open solenoid operated valve 110 to the control magnetic fluid pressure modulating electronic regulator 112. Control fluid pressure regulator 112 receives an output signal from microprocessor 78 to control the pressure in the control fluid. Solenoid operated valve 110 may be energized by an output signal from microprocessor 78 to block the control magnetic fluid to regulator 112. Control magnetic fluid pressure through line 114 to normally closed shuttle valve 86 holds valve 86 in an open position for the supply of fuel to injector 10. In the event the control magnetic fluid reaches a predetermined low pressure in line 114, such as by energizing solenoid operated valve 110, shuttle valve 86 will move to closed position to block the flow of fuel to injector 10. Control magnetic fluid pressure from regulator 112 is communicated through inlet 60 and control magnetic fluid passage 62 in fuel injector 10 in valves 38 and 50 to urge valves 38 and 50 to seated position.

It is noted that auxiliary fuel pump 72 and auxiliary control magnetic fluid pump 94 are driven by a separate hydraulic motor 74. For continous operation of the engine, a separate engine driven fuel pump 116 driven from the engine supplies fuel from fuel tank 68 through a fuel pressure electronic regulator 118 which receives an electronic output signal from microprocessor 78 for modulating the fuel pressure for supply through main supply line 83. Fuel pump 116 is connected by shaft 120 to a control magnetic fluid pump 122 to supply control magnetic fluid from control magnetic fluid tank 70 through shuttle valve 102 to control magnetic fluid supply line 104. Control magnetic fluid is returned to control magnetic fluid tank 70 through main return line 115 and branch return line 117 from electronic regulator 112.

As an example of an internal combustion engine with which the present invention has been found to function in a satisfactory manner, a marine diesel engine for a ship such as a Sulzer type 4RTA-58 diesel engine manufactured by Sulzer Brothers, Limited, Winterthur, Switzerland has been found to operate satisfactorily with the described fuel injection system.

The fuel system of this invention operates under four modes of operation and is in compliance with the rules and regulations of various agencies, such as the American Bureau of Shipping, the United States Coast Guard and Lloyd's Register of Shipping. The four modes of operation are: (1) fuel recirculation mode, (2) fuel injection engine start mode, (3) engine continuous operation mode, and (4) emergency operation mode. The fuel recirculation mode is prior to fuel injection by injector 10. The remaining three modes involve the injection of fuel by fuel injector 10. A summary of the present fuel system with a marine diesel engine such as the above is described below.

Operation of the Pressure Modulated Fuel System

The operating modes of the pressure-current modulated fuel system utilizing a fuel injector as shown in FIGS. 1 and 2 are as follows:

Recirculation Mode

To operate a direct reversing engine continually on heavy fuels without changing to diesel fuel, the fuel system should have features which permit the heavy fuel to continuously circulate from the storage tanks through the fuel system especially between the fuel pumps, the high pressure supply line from pump to injector, and back to the storage tank. Recirculation prevents solidification of the heavy fuel inside high pressure lines and the injector itself and keeps the injector hot when the engine stops.

The pressure-current modulated control fuel injector 10 operates as follows in the recirculation mode as shown in FIGS. 1 and 2. Preheated heavy fuel is pumped from storage tank 68 by externally driven main standby pump 72 as shown in FIG. 3. Pressurized fuel at a recirculation pressure of 8–10 bars as determined by electronic fuel pressure regulator 76 flows from the main standby pump 72 through the high pressure line 80 to shuttle valve 82, then through high pressure manifold 83 to inlet port 14 of injector 10, and next through central fuel passage 16 and port 22 to recirculation valve 32. The pressurized fuel passes through slot 24 of the recirculation valve 32 shown in a left position in FIG. 1 supported by spring 25. The fuel from the center passage 16 of the high pressure connector 14 at a pressure of 8–10 bars cannot close the valve 32 because the force of the spring 25 is greater than the fuel recirculating pressure (force) on the left side of valve 32. Under this condition, the fuel passes between a clearance 24 in the recirculation valve 32 and valve body 31. The clearance or slot 24 operates as an orifice and restricts flow from the high pressure pump 72. Fuel through the clearance or orifice 24 passes to an annular space in valve body 31 to heat valve body 31, then through passage 30 to line 88, check valve 92, and manifold 90 back to storage tank 68 preventing solidification of the heavy fuel and warming up the entire pressure modulated fuel injector 10. The logic control of FIG. 4 detects this abnormal function of each injector 10 and formulates an output signal from microprocessor 78 to normally open shutdown fluid control valve 110. Valve 110 energizes and blocks magnetic fluid control pressure to normally closed shutdown valve 86. Valve 86 then closes to block recirculation fuel flow to the defective fuel injector 10 thereby to provide a novel safety feature.

Injection Mode

During injection, fuel pressure varies between 800–1000 bars depending on engine power requirements. Fuel flow is significantly greater than during the recirculation mode. Under this condition the clearance or orifice 24 between recirculation valve 32 and valve body 31 cannot release high fuel pressure and flow. This results in pressure (force) increases at the right side of the recirculation valve 32 to move the recirculation valve 32 to the left. Recirculation valve 32 closes the fuel passages 30 into the valve guide body 31 to the recirculation line 88. The needle valve 38 with a stroke of 2-3 mm, under high pressure, 800-1000 bars, moves against stop 58 and fully opens the fuel flow between the needle valve 39 and injection control valve guide seat 42. Fuel passes through the six passages 46, evenly distributing pressure and temperature into fuel injection valve body 53. Needle end 52 of the fuel injection valve 50 is lifted by fuel pressure in fuel chamber 48. The strokes of fuel injection valve 50 and injection control valve 38 are limited by stops 58. Injection pressure, timing, fuel quantity and other injection parameters are determined by fluid control pressure variances from passage 62 and electric current variances to electromagnetic coils 63 and 64. The needle end 52 of the fuel injection valve 50 is loaded by electromagnetic force of coil 64 and 200-300 bars of control magnetic fluid pressure. During injection, pressure (force) from fuel pump 72 or 116 is greater than pressurecurrent (force) from the control magnetic fluid pressure under needle valves 38 and 50. Upon opening of needle valve 38, fuel passes to atomizer 18 and orifices 20 for injection into the cylinder for combustion.

During injection, fuel passes through six passages 46 into injection control valve body 57 and six passages 46 into injection valve body 53 to provide bore cooling for injector control valve 38 and fuel injector valve 50. The control magnetic fluid during injector operation also internally cools needle valves 38 and 50.

Variable Injection Pressure Mode Of Fuel Injector Operation

Variable control magnetic fluid pressure from the magnetic fluid control pressure pump 94 shown in FIG. 3 enters the magnetic fluid control inlet 60 of fuel injector body 12. Magnetic fluid control pressure through the passage 62 simultaneously loads the needle valve 38 in injection control valve body 57 and needle valve 50 in fuel injection valve body 53. A small annular clearance is provided about the outer peripheries of needle valves 38 and 50 and the adjacent surfaces of the injector body which act as guides for needle valves 38 and 50. The annular clearance has a radial width of around two to five microns and the magnetic control fluid in the annular clearances provide a magnetohydrodynamic seal and a fluid surface tension which centers valves 38 and 50 while preventing penetration of fuel within the clearance. Thus, magnetohydrodynamic seals are created around both needle valves 38 and 50 due to the magnetic fluid tension effect as described in U.S. Pat. No. 4,957,085. Both needle valves 38 and 50 are closed by magnetic fluid control pressure and by electromagnetic force created by coils 63 and 64. Fuel enters the connector or port 14 from the high pressure main fuel pumps 72 or 116 as shown in FIG. 3. Varying of upper and lower pressure frequency levels of the control pressure under the valves 38 and 50 and electric current levels at electromagnetic coils 63 and 64, permits fuel pressure from pump 72 or 116 to override the force of the control magnetic fluid against the needle end 39 of the fuel injection control valve 38. Fuel passes to the needle end 52 of the fuel injection valve 50, which is loaded by the same magnetic fluid control pressure as valve 38, and lifts this needle valve 50 to inject fuel into the cylinder through orifices 20 of atomizer 18. Varying the magnetic fluid control pressure-current and time acting against needle end 39 of the injection control valve 38 makes it possible to change fuel injection pressure, fuel quantity, and timing on the first stage of the injection process. Varying the control pressure-current above the needle end 52 of the fuel injection valve 50 governs the injection pressure on the second stage of the injection process and prevents penetration of combustion products inside injector 10 while simultaneously determining the end of fuel injection. As described, the injection control valve 38 and the fuel injection valve 50 operate as first and second stage remotely controlled pilot operated pressure regulators. To increase or decrease magnetic fluid control pressure-current and pressure-current acting time to a predetermined level, the needle ends 39, 52 of the injection control valve 38 and injection valve 50 operate in a variable pressure-current mode which determines the beginning, duration, fuel quantity and end of the injection process. Modulated fluid control pressure-current does not have hysteresis as conventional existing electronic controls. This feature significantly increases the response sensitivity of the fuel system.

Force equations for operating conditions of the pressure modulated fuel injector 10 of this invention may be described as follows:

$$F_1 = P_c \times A_{u1}$$

$$F_1 = P_{op1} \times A_{u2}$$

$$F_2 = (P_c \times A_{M1}) + F_{em}$$

$$F_2 = P_{op2} \times (A_{M1} - A_{M2})$$

Where:

| | |
|---|---|
| ELM | Electromagnetic force of coils 63 and 64 |
| $P_c$ | Fluid control pressure |
| $A_{u1}$ | Full area of the cross section of the needle end 39 of the injection control valve 38 |
| $F_1$ | Pressure force from fuel into passage of the Hp connector 14 |
| $A_{u2}$ | Area of the cross section of the needle end 39 of the injection control valve 38 at the fuel inlet. |
| $P_{op1}$ | Fuel pressure to create force $F_1$ above needle end 39 of injection control valve 38 |
| $A_{M1}$ | Full area of the cross section of the needle end 52 of the fuel injection valve 50 |
| $A_{M2}$ | Area of the cross section of the needle end 52 of the fuel injection valve 50 at the fuel outlet. |
| $F_2$ | Force created by fluid control pressure at full area of the cross section of the needle end 52 and equal force at differential area of the needle end 52 of the fuel injection valve 50 |
| $P_{op2}$ | Fuel passage at differential area of the needle end 52 of the fuel injection valve 50 which creates force $F_2$ |

As has been proven by experiments, normal atomization is achieved under the following condition:

$$P_{op1} = 1.7P_{op2} \div 2P_{op2}$$

Operating Principle of Pressure Modulated Electronic Control System

The principle of operation for the pressure modulated electronic control system for this invention has been made in compliance with the American Bureau of Shipping, U.S. Coast Guard and Lloyd's Register of Shipping. The system operates under four modes of operation and is designed to permit operation of the engine on extremely heavy fuels as well as conventional distilled diesel fuels.

Mode One—Recirculation—Engine Condition—Stop—FIG. 3

Under this condition, heavy fuel from the storage tank 68 is pumped by externally driven main fuel pump 72. The pump 72 operates under recirculation pressure of 8–10 bars. This pressure is predetermined by electronically controlled fuel pressure regulating valve 76. Fuel from main pump 72 is transmitted through pressure manifold 83 and emergency shutdown valves 86 to fuel injectors 10. A recirculation pressure of 8–10 bars is provided through recirculation valves 31 of fuel injectors 10. (The operation of the pressure-current modulated control fuel injector 10 is described above under the injection mode). Fuel under recirculation pressure passes through the non-return valve 92 to manifold 90 and then back to storage tank 68. In this condition, preheated heavy fuel continuously circulates in the recirculation loop system preventing solidification of heavy fuel in manifold 83, fuel injector 10, and recirculation return manifold 90.

During the recirculation mode, the externally or non-engine driven high pressure fuel pump 72 is driven by hydraulic motor 74. Through shaft 96 the non-engine driven control magnetic fluid pump 94 is driven. When the recirculation mode is in operation, the electronic signal to the variable fuel pressure control valve 76 maintains pressure from fuel pump 72 to shuttle valve 82 at 8–10 bars. The control magnetic fluid pump 94 transmits magnetic fluid control pressure to shuttle valve 102 with the maximum magnetic fluid control pressure being predetermined by pressure relief valve 98. The control magnetic fluid pressure is transmitted through valve 102 to the control fluid pressure manifold 104 and to the fluid control pressure emergency normally open (NO) shutdown valve 110. From (NO) valve 110 control magnetic fluid pressure passes to the fluid control pressure modulating regulator 112 for actuation of normally closed (NC) emergency shutdown valve 86 for opening of valve 86. Control pressure is then transmitted to pressure-current modulated control injector 10 for loading the needle end 39 of the injection control valve 38 and the needle end 52 of the fuel injection valve 50 as has been fully described above.

Mode Two—Engine condition—Start or Maneuvering

To start the engine it is necessary to formulate a command signal (for example, start-slow ahead). This command signal is sent from the bridge control (BCC) to the logic control (FIG. 4). The function of the logic control will be described below. The approximate electronic signal, according to the system operating algorithm, will be received by the variable fuel pressure electronic control valve 76. The non-engine driven high pressure fuel pump 72 will increase the pressure from 8–10 bars to the required operating injection pressure. Fuel flow continues through shuttle valve 82 entering the manifold 83. High fuel pressure from manifold 83 passes through the emergency NC shutdown valve 86 which is in open condition and fuel enters the pressure modulated control fuel injectors 10. Simultaneously, control magnetic fluid pressure from magnetic fluid control pump 94 which is driven from shaft 96 supplies control pressure through shuttle valve 102 to fluid control pressure manifold 104. From manifold 104, magnetic fluid control pressure is provided to NO solenoid valve 110. From NO solenoid valve 110 control magnetic fluid enters modulating pressure regulator 112 and from regulator 112 passes to the emergency NC shutdown fuel pressure control valve 86 for maintaining an open position. From solenoid valve 110 fluid control pressure is provided to fluid control modulating pressure electronic regulators 112. From electronic regulator 112 fluid control pressure is transmitted to NC fuel pressure control valve 86 to open valve 86 for the supply of fuel to pressure modulated control injector 10. An electronic signal from the logic control of FIG. 4 formulates a modulated signal from microprocessor 78 to electronic regulator 112 in compliance with the firing order and other ambient conditions of the engine. To achieve fuel injection into the cylinder the electronic signal is received by the modulating pressure regulator 112. Regulator 112 reduces magnetic fluid control pressure to the pressure modulated control fuel injector 10. Under this condition the higher fuel pressure in chamber 48 opens needle end 52 of injection control valve 50 causing fuel to be injected into the operating cylinder through orifices 20 according to the combustion order of the engine. Depending upon engine condition and operating requirements, the injection parameters of fuel timing, fuel quantity, fuel duration, valve timing-stroke, and other parameters are formulated by the logic control (FIG. 4). The output controllable signal from microprocessor 78 to fuel injector 10 is regulated by pressure modulating electronic regulator 112 and the high pressure fuel electronic regulator 76. Varying the electronic input signal from regulators 76 and 112 produces variable hydraulic output signals to pressure modulated control fuel injector 10.

Mode Three—Main Operation—Engine Condition—Continuous Operation

In the continuous mode of operation, high fuel pressure is produced by the engine driven high fuel pressure pump 116 and magnetic control pressure is produced by the engine driven magnetic fluid control pump 122 which are both driven by shaft 120 directly or indirectly from the engine. In the main mode of operation, heavy fuel from the main storage tank 68 and the engine driven high pressure fuel pump 116 enters the high fuel pressure electronic regulator 118 and shuttle valve 82. When the engine receives the command to activate the "main" mode of operation, the external drive of the standby high pressure externally driven fuel pump 72 automatically stops. Pressure to shuttle valve 80 on the left side drops and valve 82 shifts to the left and switches fuel flow from the high pressure electronic regulator 118 to the fuel pressure manifold 83. High pressure fuel flow and fuel distribution to the pressure modulated fuel injectors 10 continue in the same way as has been described previously when the standby pump 72 was in operation. The magnetic fluid control pressure under the "main" mode from storage tank 70 is produced by magnetic fluid control pressure pump 122 driven by engine shaft 120 and transmitted to shuttle valve 102. The standby auxiliary magnetic fluid control pressure pump 94 stops and the pressure on the left side of shuttle valve 102 is then lowered. Shuttle valve 102 shifts to the left and to shift the flow of fluid control pressure from pump 94 to pump 122 for fluid control pressure manifold 104. Control fluid pressure flow and distribution to fuel injectors 10 continue in the same way as has been described previously when the auxiliary fluid control pressure pump 94 was in operation. Standby pump 72 receives a signal to stop. Any failure of the high pressure fuel pump 116 or fluid control pump 122 driven by the main engine automatically starts the external motor driven high fuel pressure pump 72 and fluid control pressure pump 94 preventing engine operating failure as is required by major classification society rules.

Mode Four—Emergency Operation—Engine Condition: Continuous or Intermittent Operation In case of a pressure modulated control injector 10 failure, the logic control (FIG. 4) will determine the cause of the failure and if, by diagnostic logic control, the pressure modulated control injector 10 cannot operate, a failure prevention signal will energize the NO solenoid valve 110 to move valve 110 to a closed position. The control magnetic fluid pressure signal will be cut off to the pressure modulating regulator 112 and to NC emergency fuel pressure valve 86. The high pressure fuel flow to the pressure modulated control injector 10 will also be cut off. Under these conditions, the cylinder which has been cut off from fuel supply will cease operating. The logic control (FIG. 4) will redistribute the load between the remaining operating cylinders to compensate for the power loss. Simultaneously, the display monitor of the logic control (FIG. 4), informs engine operations about the event and will provide a list of possible solutions for repair. After the problem that caused the failure has been eliminated, the system will self-check and put all cylinders back into normal operation as described above.

The engine digital governor (EDG) is a complete control system which fulfills all tasks for governing optimum functions and depends on the engine power output requirements. The parameters setting may be from two controls, the bridge control system at BCC and the engine-room control system at ERC as shown in FIG. 4. The EDG can be operated for both a fixed pitch and a controllable pitch propeller power plant (FPP and CPP systems). The system responds to engine signals from external monitoring systems.

The EDG includes microprocessor 78 and performs computerized output operations, all measurements, and control signals. The system is capable of selecting, adjusting, and testing the system performance. The main purpose of the system is to control the engine fuel supply in order to maintain an engine speed corresponding to a reference setting and load requirements.

The speed pick-up sensors are of an inductive type. An engine scavenging air pressure transducer is able to limit the fuel injection level according to turbo pressure value. For CPP systems, the pitch value is inputted to compensate for loading conditions. The operating signal input to the system may be one of two, selected either from the control-room or from the bridge (ship systems).

FUNCTIONAL ALGORITHM

The functional algorithm includes the following operations:

| | | |
|---|---|---|
| 1. | BSC | Bridge Command Control |
| 2. | ERC | Engine Room Control |
| 3. | SSC | System Status Control |
| 4. | OPC | Optimum Parameters Computer |
| 5. | EDS | Engine Diagnostic System |
| 6. | RPL | Repair Procedures Library |

-continued

| | | | |
|---|---|---|---|
| 7. | VDM | Video Display Monitor | |
| 8. | ESC | Engine Status Monitoring System consists of 7 subsystems A–G as designated in FIG. 6 and as follows: | |
| A. | | Dynamic Condition Monitoring computes the signals from: | |
| | | ESC | Engine Speed Monitoring |
| | | TVC | Torsional Vibration Monitoring |
| | | EAC | Engine Acceleration Monitoring |
| | | DRC | Directional Rotation Monitoring |
| | | TLC | Torsional Load Monitoring |
| B. | | Status Monitoring computes the signals from: | |
| | | StAh | Engine Start Ahead Monitoring |
| | | RvAst | Engine Reverse Astern Monitoring |
| | | CSAh | Engine Combustion Sequence Ahead Monitoring |
| | | CSAst | Engine Combustion Sequence Astern Monitoring |
| | | StAst | Engine Start Astern Monitoring |
| | | RvAh | Engine Reverse Ahead Monitoring |
| | | WCM | Weather Condition Monitoring |
| | | DStM | Dynamic Start Monitoring |
| C. | | Cooling and Lubrication Monitoring computes the signals from: | |
| | | WT°C | Water Temperature Monitoring |
| | | WPC | Water Pressure Monitoring |
| | | $L_OPC$ | Lube Oil Pressure Monitoring |
| | | $L_OTC$ | Lube Oil Temperature Monitoring |
| | | $L_OQC$ | Lube Oil Consumption Monitoring |
| D. | | Load Distribution Monitoring computes the signals from: | |
| | | ELC | Engine Load Monitoring |
| | | LLC | Load Limit Monitoring |
| | | LSC | Load Sharing Monitoring |
| | | CPC | Compression Pressure Monitoring |
| | | $M_XPC$ | Maximum Pressure Monitoring |
| | | PAC | Pressure Acceleration Monitoring |
| | | CT°C | Compression Temperature Monitoring |
| | | $M_XCT°$ | Maximum Temperature Monitoring |
| E. | | Turbocharger condition Monitoring computes the signals from: | |
| | | TRC | Turbocharger Revolution Monitoring |
| | | $T_{CH}PC$ | Turbocharger Pressure Monitoring |
| | | $T_{CH}T°C$ | Turbocharger Temperature Monitoring |
| | | $E_XT°C$ | Exhaust Temperature Monitoring |
| | | $E_XPC$ | Exhaust Pressure Monitoring |
| | | $E_XQC$ | Exhaust Quality Monitoring |
| F. | | Fuel Consumption Monitoring computes signals from: | |
| | | FFC | Fuel Flow Monitoring |
| | | $F_OT°C$ | Fuel Temperature Monitoring |
| | | $F_OPC$ | Fuel Pressure Monitoring |
| | | IPC | Injection Pressure Monitoring |
| | | FPC | Fluid Pressure Monitoring |
| | | RPC | Recirculation Pressure Monitoring |
| G. | | ASC | Ambient Status Monitoring computes signals from: |
| | | AT°S | Ambient Temperature Status Monitoring |
| | | BPC | Barometer Pressure Status Monitoring |
| | | HCM | Humidity Status Monitoring |

The engine digital governor control (EDG) includes microprocessor 78 and processes data received in computed signals from the engine condition monitoring system to perform the following functions:

| | |
|---|---|
| VIP | Variable Injection Pressure Control |
| VIT | Variable Injection Timing Control |
| IDT | Injection Duration Timing Control |
| $F_OQC$ | Fuel Quantity Control |
| $P_LIT$ | Pilot Injection Timing Control |
| $P_LPT$ | Pilot Pressure Timing Control |
| $P_LDT$ | Pilot Duration Timing Control |
| $P_LFQ$ | Pilot Fuel Quantity Control |
| CSC | Engine Combustion Sequence Control |
| $S_tA_hC$ | Engine Start Ahead Control |
| $R_vA_{st}C$ | Engine Reverse Astern Control |
| $S_tA_{st}C$ | Engine Start Astern Control |
| $R_vA_hC$ | Engine Reverse Ahead Control |

-continued

| | |
|---|---|
| NS$_C$ | Normal Start Control |
| DS$_C$ | Dynamic Start Control |
| C$_R$OQ | Cylinder Oil Quantity Control |
| AFR | Air Fuel Ratio Control |
| VVT | Variable Valve Timing Control |
| VVS | Variable Valve Stroke Control |

The main purpose of the monitoring system is to monitor various functions of the engine including (a) monitoring the command for performance quality from the EDG, and (b) monitoring the commanded value for fuel pressure, fluid control pressure, and engine operating conditions. The monitoring of engine conditions contains several secondary functions including: (1) displaying engine operating data values, (2) automatic tuning of system, and (3) repeated testing of system failures.

When the engine operates on slow RPM, it is necessary to change operation condition to half-speed as requested by the operator from BCC control. The signal from BCC is transmitted to the optimum parameters computer. From the optimum parameters computer the signals are divided and are transmitted to the engine digital governing control, the engine diagnostic system, the system status control, and the repair procedure library. The system status control summarizes the operating condition of the engine in real time, compares the condition of the engine with optimum parameters, and then formulates an output signal through microprocessor 78 to the governing output elements of the engine with different output signals influencing changing engine status.

Through the output signals from microprocessor 78 of the engine digital governor control (EDG), the engine parameters are changed. A major output functional solenoid with an integral armature-position transducer (not shown) is used to set pressure. Changes in pressure are proportional to changes in electrical input. The position of the solenoid armature produces voltage through the transducer which is compared with the input signal and corrected by a position control circuit of a power amplifier. The solenoid armature stroke is proportional to the electric demand signal input and is measured by an inductive displacement transducer. The output signal from this transducer thus provides a measure of the solenoid-armature position. The amplifier circuit closes the proportional solenoid position feedback loop and electronically controls the solenoid's stroke.

Fuel injection needle valve 50 and fuel injection control needle valve 38 mounted for movement between open and closed positions are responsive to a force differential resulting from a variable force provided by pressurized fuel acting against one end of needle valves 38 and 50 and a variable force acting in opposed relation against the other opposed end of needle valves 38 and 50. The variable force acting against the opposed end of needle valves 38 and 50 is provided by the pressure of the pressurized control fluid and by the magnetic force exerted by coils 63 and 64. The force generated from the pressure of the pressurized fuel is controlled and varied by output signals from microprocessor 78 and electronically controlled fluid pressure regulators 76 and 118 for fuel pumps 72 and 116. The force generated from the pressure of the control fluid is controlled and varied by output signals from microprocessor 78 to electronically controlled fluid pressure regulator 112. The magnetic force is varied and controlled by output signals from microprocessor 78 to coils 63 and 64. Thus, output signals from a single control provided by microprocessor 78 of the engine digital control (EDC) controls and governs the entire fuel injection system of this invention.

The integrated automated fuel system of the present invention may be provided with various types of fuel injectors preferably utilizing a fuel injection valve and responsive to fluid pressure differentials between pressurized fuel and pressurized control fluid controlled by output signals from a microprocessor. The fuel injection system is a single integrated system including (1) fuel recirculation prior to fuel injection, (2) engine starting, (3) engine continuous operation, and (4) emergency operation of the engine. A single microprocessor provides output signals for the complete control of the system.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A fuel injection system for a multi-cylinder internal combustion engine for the injection of pressurized fuel prior to engine starting and the injection of pressurized fuel intermittently during continuous engine operation after starting; said fuel injection system comprising:

a fuel injector;

a fuel source and an engine driven pump to supply pressurized fuel from the fuel source to the fuel injectors during continuous operation of the engine;

an auxiliary non-engine driven pump to supply pressurized fuel from the fuel source to the fluid injectors independently of said engine driven pump for providing fuel to the injectors prior to engine starting;

a fuel passage in each injector including a discharge port for injecting pressurized fuel into an associated cylinder;

a fuel injection valve in said fuel passage in fluid communication with pressurized fuel adjacent one end and movable between open and closed positions relative to said fuel passage;

an electronically controlled variable force transmitting means adjacent the other end of said fuel injection valve providing a force opposed to the force of said pressurized fuel; and control means for monitoring predetermined engine conditions and for formulating output signals in response to the monitored engine conditions; said control means including a microprocessor sending output signals from said control means to said electronically controlled variable force transmitting means to vary the force transmitted by said variable force transmitting means against said other end of said fuel injector valve to an amount in accord with said output signals;

said control means selectively controlling the supply of pressurized fuel to said fuel injectors sequentially between said engine driven fuel pump and said non-engine driven fuel pump.

2. A fuel injection system as set forth in claim 1 wherein a control fluid passage is provided in each fuel injector in fluid communication with the other end of said fuel injection valve;

means supply a control fluid to said control fluid passage; and means are provided to vary the pressure of said pressurized control fluid thereby to provide said variable force transmitting means adjacent the other end of said fuel injection valve.

3. A fuel injection system as set forth in claim 1 wherein said fuel injection valve is formed at least in part of a magnetic material and a magnetic coil is provided in the fuel injector about said fuel injection valve; and said control means includes means to energize said magnetic coils for providing said variable force transmitting means adjacent said other end of said fuel injection valve.

4. An integrated and automated fuel system for a multi-cylinder internal combustion engine comprising:

injection means to inject pressurized fuel within each of the cylinders movable between an open position to supply fuel to an associated cylinder and a closed position to block fuel to the associated cylinder;

means to supply pressurized fuel to said injection means;

means to supply pressurized control fluid for said injection means to permit opening of said injection means at a first predetermined pressure differential between the pressurized fuel and the pressurized control fluid and to permit closing of said injection means at a second predetermined pressure differential between the pressurized fuel and the pressurized control fluid;

monitoring means for sensing predetermined conditions of said internal combustion engine and;

means responsive to said monitoring means for providing an output signal to said means to supply pressurized fuel to modulate the pressure of said fuel to a predetermined amount corresponding to said output signal.

5. An integrated and automated fuel system as set forth in claim 4 wherein means responsive to said monitoring means provide an output signal to said means to supply pressurized control fluid to modulate the pressure of said control fluid to a predetermined amount corresponding to said output signal.

6. An integrated and automated fuel system as set forth in claim 5 wherein said means to supply pressurized control fluid comprises a control fluid reservoir, a control fluid pump, a control fluid line from said control fluid pump to said injection means, and a pressure regulator in said control fluid line, said pressure regulator in said control fluid line being responsive to said output signal to control the pressure of said control fluid.

7. An integrated and automated fuel system as set forth in claim 4 wherein said means to supply pressurized fuel comprises a fuel reservoir, a pump, a fuel line from said pump to said injection means, and a pressure regulator in said fuel line, said pressure regulator being responsive to said output signal to control the pressure of said fuel.

8. An integrated and automated fuel system for a multi-cylinder internal combustion engine comprising:

a fuel injector for the cylinders having a fuel pressure source to supply pressurized fuel to the cylinders, said fuel injector having a downstream fuel injection valve mounted in said fuel passage for movement between open and closed positions and an upstream fuel injection control valve mounted in said fuel passage upstream of said fuel injection valve for movement between open and closed positions independently of said fuel injection valve; and control means responsive to predetermined operating conditions of said internal combustion engine for effecting opening of said fuel injection control valve prior to opening of said fuel injection valve and effecting closing of said fuel injection control valve prior to closing of said fuel injection valve thereby to provide a delayed opening and a delayed closing of said fuel injection valve relative to the opening and closing of said fuel injection control valve;

said control means including a pressurized magnetic control fluid, said fluid injection control valve being responsive to both said pressurized fuel and said pressurized magnetic control fluid, and opening and closing in response to predetermined fluid pressure differentials between said pressurized fuel and said pressurized magnetic control fluid.

9. An integrated and automated fuel system as set forth in claim 8 wherein said control means further includes monitoring means for sensing predetermined operating conditions of said internal combustion engine, and means responsive to said monitoring means for providing an output signal for said control means for effecting opening and closing of said fuel injection control valve.

10. An integrated and automated fuel system as set forth in claim 9 wherein said upstream fuel injection control valve is formed at least in part of a magnetic material, and said control means includes a magnetic coil about said fuel injection control valve energizable by said output signal.

11. An integrated and automated fuel system as set forth in claim 9 wherein said fuel injection valve is formed at least in part of a magnetic material, and said control means further includes a magnetic coil about said fuel injector valve and a microprocessor providing an output signal to energize said magnetic coil about said fuel injection valve.

12. An integrated and automated fuel system as set forth in claim 8 wherein a control fluid passage is provided in said fuel injector for said pressurized magnetic control fluid, said fuel injection control valve being in fluid communication on one end thereof with pressurized fuel in said fuel passage and in fluid communication on an opposed end with said pressurized magnetic control fluid in said control fluid passage, said upstream fuel injection control valve opening and closing in response to predetermined fluid pressure differentials between said pressurized fuel and said pressurized magnetic control fluid acting against opposite ends of said upstream fuel injection control valve.

13. An automated fuel system for an internal combustion engine having a crankshaft and a plurality of cylinders connected to the crankshaft for reciprocation; said fuel system comprising:

a fuel injector for said cylinders having a fuel passage for providing fuel to an associated cylinder;

a fuel injection valve mounted in said fuel passage of said fuel injector and movable between open and closed positions relative to said fuel passage with fuel being provided to the associated cylinder when said fuel injection valve is opened;

a pressurized control fluid for controlling the opening and closing of said fuel injection valve, said fuel injection valve being responsive to said pressurized control fluid;

means for sensing predetermined operating conditions of the internal combustion engine and effecting desired predetermined changes in the pressure of said control fluid in response to the sensed operating conditions for effecting opening and closing of said fuel injection valve;

fuel supply means operated independently of said crankshaft of said internal combustion engine to supply fuel to said fuel passage of said fuel injector; and control fluid supply means operated independently of said crankshaft of said internal combustion engine to supply pressurized control fluid to said separate pressurized control fluid means.

14. An automated fuel system as set forth in claim 13 wherein a fuel injection control valve is mounted in said fuel passage upstream of said fuel injection valve and in continuous fluid communication with fuel in said fuel passage, said fuel injection control valve being responsive to said pressurized control fluid and movable between open and closed positions relative to said fuel passage at predetermined pressure differentials between said pressurized fuel and said pressurized control fluid.

15. An automated fuel system as set forth in claim 13 wherein a fluid pressure regulator is provided for said control fluid; and said means for sensing predetermined operating conditions includes a microprocessor providing an output signal to said fluid pressure regulator for varying the pressure of said control fluid in response to operating conditions of the internal combustion engine.

16. An automated fuel system as set forth in claim 15 wherein a fluid pressure regulator is provided for said fuel; and said microprocessor provides an output signal to said fluid pressure regulator for said fuel for varying the pressure of said fuel in response to operating conditions of the internal combustion engine.

17. An automated fuel system for an internal combustion engine as set forth in claim 13 wherein said control fluid supply means comprises a control fluid reservoir, a control fluid pump connected to said reservoir to pump control fluid therefrom, and external drive means for driving said control fluid pump independently of said crankshaft.

18. An automated fuel system for an internal combustion engine as set forth in claim 17 wherein said external drive means comprises a motor.

19. An automated fuel system for an internal combustion engine as set forth in claim 17 wherein a second control fluid pump driven from said crankshaft is connected to said control fluid reservoir to provide pressurized control fluid independently of said first control fluid pump.

20. An automated fuel system for an internal combustion engine as set forth in claim 13 wherein said fuel supply means comprises a fuel reservoir, a fuel pump connected to said reservoir to pump fuel therefrom, and external drive means for driving said fuel pump independently of said crankshaft.

21. An automated fuel system for an internal combustion engine as set forth in claim 20 wherein said external drive means comprises a motor.

22. An automated fuel system for an internal combustion engine as set forth in claim 20 wherein a second fuel pump driven from said crankshaft is connected to said fuel reservoir to provide pressurized fuel independently of said first mentioned fuel pump.

23. A fuel injection system for injecting fuel into a cylinder of an internal combustion engine comprising:

a fuel source and a fuel pump to supply pressurized fuel;

a fuel injector having an injection port for the injection of pressurized fuel within the cylinder;

a fuel passage from said fuel pump to said injection port through at least a portion of said fuel injector;

a fuel injection valve mounted within said fuel passage for said injector port movable between a first position permitting the flow of fuel to said injection port and a second position blocking the flow of fuel to said port;

a control fluid source and a control fluid pump to supply pressurized control fluid;

an injection control valve means to control the movement of said fuel injection valve between said first and second positions; and a control fluid passage from said control fluid pump for the supply of pressurized control fluid and being in fluid communication with said injection control valve means; said injection control valve means being responsive to said control fluid and operatively connected to said fuel passage to permit fuel flow to said fuel injection valve in one position and to block fuel flow to said fuel injection valve in another position, said injection control valve means being actuated independently of said fuel injection valve.

24. A fuel injection system for an internal combustion engine as set forth in claim 23 wherein said injection control valve means includes an injection control valve in said fuel passage upstream of said fuel injection valve and movable between an open position permitting the flow of fuel to said fuel injection valve and a closed position blocking the flow of fuel to said fuel injection valve.

25. A fuel injection system for an internal combustion engine as set forth in claim 24 wherein said injection control valve is in fluid communication with pressurized fuel from said fuel passage on one side thereof and in fluid communication with pressurized control fluid from said control fluid passage on an opposed side thereof for actuation by a predetermined pressure differential between pressurized fuel and pressurized control fluid.

26. A fuel injection system for an internal combustion engine as set forth in claim 23 wherein said fuel injection valve is in fluid communication with pressurized control fluid on one side thereof and in fluid communication with pressurized fuel on an opposed side thereof.

27. A fuel injection system for an internal combustion engine as set forth in claim 23 wherein an electronically controlled fluid pressure regulator is provided in said control fluid passage for regulating the pressure for said control fluid;

a plurality of monitors are provided for monitoring predetermined operating parameters of said engine; and data processing means are provided to receive data from said monitors and to send output signals to said fluid pressure regulator for varying the pressure of said control fluid in response to operating conditions of said internal combustion engine.

28. A fuel injection system for an internal combustion engine as set forth in claim 23 wherein an electronically controlled fluid pressure regulator is provided in said fuel passage for regulating the pressure of said fuel;

a plurality of monitors are provided for monitoring predetermined operating parameters of said engine; and data processing means are provided to receive data from said monitors and to send output signals to said fluid pressure regulator for varying the pressure in said fuel in response to operating conditions of said internal combustion engine.

29. A fuel injection system for an internal combustion engine as set forth in claim 23 wherein a pair of fuel pumps are provided to supply pressurized fuel to said fuel passage with said pumps being operated at different time intervals, one of said fuel pumps being a main fuel pump driven from a crankshaft of said internal combustion engine and operable during engine operation, and the other fuel pump being an auxiliary fuel pump driven from drive means independent of said internal combustion engine and operable prior to and during starting of said engine.

30. A fuel injection system for an internal combustion engine as set forth in claim 23 wherein a pair of control fluid pumps are provided to supply pressurized control fluid to said control fluid passage with said control fluid pumps being operated at different time intervals, one of said control fluid pumps being driven from a crankshaft of said internal combustion engine and operable during injection of fuel and continuous operation of said engine, and the other control fluid pump being driven from drive means independent of said internal combustion engine and operable prior to and during starting of said engine.

31. A fuel injection system for an internal combustion engine as set forth in claim 23 wherein a normally closed valve is positioned within said fuel line and held in an open position by pressurized control fluid to permit the supply of fuel to said injector, said normally closed valve moving to closed position when the pressure of said control fluid reaches a predetermined low thereby to block the flow of fuel to the injector.

32. A fuel injection system for an internal combustion engine as set forth in claim 23 wherein a normally open solenoid operated valve is positioned within said control fluid passage and moves to a closed position upon energizing to block the flow of control fluid.

33. A fuel injection system for injecting fuel into a cylinder of an internal combustion engine comprising:

a fuel source and a fuel pump to supply pressurized fuel;

a fuel injector having an injection port for the injection of pressurized fuel within the cylinder;

a fuel passage from said fuel pump to said injection port through at least a portion of said fuel injector;

a fuel injection valve mounted within said fuel passage for said injector port movable between a first position permitting the flow of fuel to said injection port and a second position blocking the flow of fuel to said port;

an injection control valve means to control the movement of said fuel injection valve between said first and second positions;

a control fluid source and a control fluid pump to supply pressurized control fluid; and a control fluid passage from said control fluid pump for the supply of pressurized control fluid, said injection control valve means being in fluid communication with said pressurized control fluid and in fluid communication with said pressurized fuel and movable independently of said fuel injection valve between one position permitting the flow of fuel to said fuel injection valve and another position blocking the flow of fuel to said fuel injection valve.

34. A fuel injection system for an internal combustion engine as set forth in claim 33 wherein means are provided to drive said fuel pump for said fuel independently of said internal combustion engine.

35. A fuel injection system for an internal combustion engine as set forth in claim 33 wherein means are provided to drive said control fluid pump for said control fluid independently of said internal combustion engine.

36. A fuel injection system for an internal combustion engine as set forth in claim 33 wherein a plurality of monitors are provided for monitoring predetermined parameters of said engine;

data processing means are provided to receive and process data from said monitors and include a microprocessor for sending predetermined output signals in response to the data obtained from said monitors; and an electronically controlled regulator valve is positioned in said fuel passage for regulating the pressure of said fuel in response to output signals received from said microprocessor.

37. A fuel injection system for an internal combustion engine as set forth in claim 36 wherein an electronically controlled regulator valve is positioned in said control fluid passage for regulating the pressure of said control fluid in response to output signals from said microprocessor.

38. A fuel injection system for an internal combustion engine as set forth in claim 33 wherein a normally closed fluid operated control valve is positioned in said fuel passage upstream of said fuel injection; and a branch control fluid passage extends to said normally closed fluid operated control valve to provide control fluid to hold said normally closed control valve in an open position, said fluid operated control valve moving to a closed position to block fuel flow to said fuel injection valve when said control fluid reaches a predetermined minimal pressure.

39. In a fuel injection system for a multi-cylinder internal combustion engine;

a fuel reservoir and a fuel pump to supply pressurized fuel;

a fuel injector having an injection port for fuel injection and a fuel passage to said injection port through said fuel injector;

means to drive said fuel pump independently of said internal combustion engine for the supply of pressurized fuel to said injector and said injection port;

a fuel injection valve mounted within said fuel passage movable between a first position permitting the flow of fuel to said injection port and a second position blocking the flow of fluid to said port;

a control fluid source and a control fluid pump to supply a separate pressurized magnetic control fluid;

an injection control valve to control the movement of said fuel injection valve between said first and second positions and responsive to said separate pressurized magnetic control fluid for movement independently of said fuel injection valve;

a control fluid passage from said control fluid pump to said injection control valve for the supply of said separate pressurized magnetic control fluid from said control fluid pump; and means to drive said control fluid pump independently of said internal combustion engine for the supply of said separate pressurized magnetic control fluid.

40. In a fuel system as set forth in claim 39;

said injection control valve being in fluid communication with said fuel passage upstream of said fuel injection valve and controlling the flow of pressurized fuel to said fuel injection valve.

41. In a fuel system as set forth in claim 39;

said injection control valve being positioned in said fuel passage and movable to an open position to permit fuel flow to said fuel injection valve upon a predetermined pressure differential between said pressurized fuel and said separate pressurized magnetic control fluid.

42. In a fluid system as set forth in claim 39;

said fuel injection valve being in fluid communication with said separate pressurized magnetic control fluid in said control fluid passage and being moved to an open position after the opening of said injection control valve at a predetermined pressure differential between said pressurized fuel and said separate pressurized magnetic control fluid.

43. In a fluid system as set forth in claim 39;

a plurality of monitors provided for monitoring predetermined parameters of said engine;

data processing means provided to receive and process data from said monitors and including a microprocessor for sending predetermined output signals in response to the data obtained from said monitors; and an electronically controlled regulator valve positioned in said fuel passage for modulating the pressure of said fuel in response to output signals received from said microprocessor.

44. In a fluid system as set forth in claim 43;

an electronically controlled regulator valve positioned in said control fluid passage for regulating the pressure of said separate pressurized magnetic control fluid in response to output signals from said microprocessor.

45. A fuel injection system for injecting fuel simultaneously into a plurality of cylinders of a multi-cylinder internal combustion engine and comprising:

a fuel injector for said cylinders;

a fuel source and a pair of fuel pumps to supply fluid to the fuel injectors, one of said fuel pumps being an engine driven pump to supply pressurized fuel to said fuel injectors during continuous operation of said engine, the other pump being an auxiliary pump not driven from said engine to supply fuel to said fuel injectors independently of said engine driven pump prior to starting and during starting of said engine; and means to recirculate pressurized fuel from said auxiliary pump through the fuel injectors prior to starting of said engine for warming up of said fuel injectors.

46. A fuel injection system as set forth in claim 45 wherein each fuel injector has a fuel passage and a fuel injection valve in said fuel passage movable between open and closed position;

a recirculation valve is provided for said fuel passage upstream of said fuel injection valve movable between open and closed positions;

a fuel return line is provided between said recirculation valve and said fuel source to return fuel to said fuel source from said fuel injector when said recirculation valve is in an open position; and means effect closing of said recirculation valve when said fuel injection valve is in an open position for supplying pressurized fuel to the associated cylinder.

47. A fuel injection system for injecting fuel simultaneously into a plurality of cylinders of a multi-cylinder internal combustion engine and comprising:

a fuel injector for said cylinders having a fuel passage and a fuel injection valve mounted within said fuel passage movable between an open position to provide pressurized fuel to the associated cylinder and a closed position to block the flow of pressurized fuel to the associated cylinder;

a control fluid passage in said fuel injector in fluid communication with said fuel injection valve;

a control fluid source and a pair of control fluid pumps to provide pressurized control fluid to said control fluid passage, one of said control fluid pumps being engine driven to provide pressurized control fluid to said control fluid passage during continuous operation of said engine, the other control fluid pump being an auxiliary pump not driven from said engine and supplying pressurized control fluid to said control fluid passage independently of said engine driven pump prior to starting and during starting of said engine;

said fuel injection valve moving to an open position at a predetermined pressure differential between said pressurized fuel and said pressurized control fluid.

48. A fuel injection system as set forth in claim 47 wherein an electronically controlled fluid pressure regulator is provided for said control fluid;

a plurality of monitors are provided for monitoring predetermined parameters of said engine; and data processing means are provided to receive and process data from said monitors including a microprocessor for sending output signals to said electronically regulator valve for modulating the pressure of said control fluid in response to the output signals.

49. A fuel injector adapted for use with a fuel injection system for an internal combustion engine and having:

a body having a fuel passage for pressurized fuel and a discharge port for the discharge of pressurized fuel into an associated cylinder of the internal combustion engine;

an elongate fuel injection needle valve of a generally circular cross section mounted in said fuel passage upstream of said discharge port for movement between open and closed positions, said fuel passage in said fuel injector body being defined by a generally cylindrical surface adjacent said needle valve for guiding said fuel injection needle valve in movement between open and closed positions and forming an annular clearance of a predetermined radial distance between said needle valve and said cylindrical surface;

a control fluid passage in said fuel injector body in fluid communication with said annular clearance; and a pressurized control fluid for said control fluid passage and said annular clearance, said pressurized control fluid having magnetic particles therein to provide a magnetic control fluid for sealing between said fuel injection needle valve and the adjacent guiding surface defining said fuel passage.

50. A fuel injector as set forth in claim 49 wherein said fuel injection needle valve is in fluid communication with pressurized fuel adjacent one end thereof and in fluid communication with pressurized control fluid adjacent an opposite end thereof.

51. A fuel injector as set forth in claim 50 wherein a fuel injection control needle valve is provided in said fuel passage upstream of said fuel injection needle valve and controls the flow of pressurized fuel in said fuel passage to said fuel injection needle valve, said fuel injection control needle valve being in fluid communination with pressurized fuel adjacent one end and in fluid communication with magnetic control fluid adjacent the other end thereof.

52. A fuel injector as set forth in claim 49 wherein said fuel injection needle valve is formed at least in part of a magnetic material; and a magnetic coil is positioned in said fuel injector body about said fuel injection needle valve adapted to be controlled from electronic signals.

53. A fuel injector as set forth in claim 51 wherein said fuel injection control needle valve is formed at least in part of a magnetic material; and a magnetic coil is positioned in said fuel injector body about said fuel injection control needle valve adapted to be controlled from electronic signals.

54. A fuel injector for injecting pressurized fuel adapted for use with a fuel injection system for an internal combustion engine and having a passage for a separate pressurized magnetic control fluid and a separate passage for said pressurized fuel; said fuel injector including:

a fuel injection valve for said fuel injector movable between open and closed positions and responsive to said pressurized fuel; and a separate injection control valve for said fuel injector movable between open and closed positions independently of said fuel injection valve and responsive to said separate pressurized magnetic control fluid, the opening of said fuel injection valve for injecting fuel being responsive to actuation of said control valve.

55. A fuel injector as set forth in claim 54 wherein said injection control valve is movable between two positions, one position blocking the flow of fuel to said fuel injection valve and the other position permitting the flow of fuel to said fuel injection valve.

56. A fuel injector as set forth in claim 55 wherein said injection control valve is positioned in said fuel passage upstream of said fuel injection valve and is movable between open and closed positions relative to said fuel passage, said injection control valve blocking the flow of fuel to said fuel injection valve in a closed position and permitting the flow of fuel to said fuel injection valve in an open position.

57. A fuel injector as set forth in claim 54 wherein said injection control valve is opened at a predetermined pressure differential between said separate pressurized magnetic control fluid and said pressurized fuel, and said fuel injection valve is opened after said injection control valve in response to a predetermined pressure differential between said separate pressurized magnetic control fluid and said pressurized fuel independently of the opening of said injection control valve.

58. A fuel injector adapted for use with a fuel injection system for an internal combustion engine and having a passage for pressurized control fluid and a passage for pressurized fuel; said fuel injector comprising:

a fuel injection valve for said fuel injector movable between an open position permitting fuel flow to the engine and a closed position blocking fuel flow to the engine; and a separate injection control valve for controlling the flow of fuel to said fuel injector and actuated between one position permitting fuel flow to said fuel injector valve and a second position blocking fuel flow to said fuel injection valve; said injection control valve actuated independently of said fuel injector valve and responsive to a predetermined pressure differential between said pressurized control fluid and said pressurized fuel for actuation to said one position permitting fuel flow to said fuel injector valve.

59. A fuel injector as set forth in claim 58 wherein said injection control valve is positioned in said fuel passage upstream of said fuel injector valve and is movable between open and closed positions relative to said fuel passage.

60. A fuel injector as set forth in claim 59 wherein means are provided to permit the recirculation of fuel through said fuel passage in said fuel injector when said injection control valve is closed and to block the recirculation of fuel through said fuel passage in said fuel injector when said injection control valve is open.

61. A fuel injector as set forth in claim 60 wherein said means includes a recirculation valve in said fuel passage movable between an open position to permit fuel recirculation and a closed position to block fuel recirculation in said fuel injector.

62. A fuel injector adapted for use with a fuel injection system for an internal combustion engine having a pressurized control fluid and pressurized fuel; said fuel injector comprising:

a fuel discharge port adjacent one end of said injector for the discharge of fuel into a cylinder of the internal combustion engine;

a fuel supply passage in said injector in fluid communication with said fuel port to supply fuel to said port;

a fuel injection valve in said fuel supply passage for said fuel injector adjacent said fuel port movable between an open position permitting fluid flow to said fuel port and a closed position blocking fuel flow to said fuel discharge port;

an injection control valve in said fuel supply passage upstream of said fuel injection valve controlling fuel flow to said fuel injection valve and operable independently of said fuel injection valve; and a control fluid passage in fluid communication with said injection control valve, said injection control valve being responsive to pressurized control fluid and pressurized fuel and opening at a predetermined pressure differential between said pressurized fuel and said pressurized control fluid to permit the flow of fuel to said fuel injection valve.

63. A fuel injector as set forth in claim 62 wherein means are provided to permit the recirculation of fuel through said fuel passage upstream of said injection control valve when said injection control valve is in a position blocking the flow of fuel to said fuel injection valve.

64. A fuel injector as set forth in claim 63 wherein said means includes a recirculation valve in said fuel passage upstream of said injection control valve movable between one position to permit fuel recirculation and another position to block fuel recirculation.

65. A method of operation for a fuel injection system for a multi-cylinder internal combustion engine from a centralized control means for the injection of pressurized fuel prior to engine starting and injecting pressurized fuel intermittently during continuous engine operation after starting; the fuel injection system including a fuel injector for each cylinder, a fuel source, an engine driven pump to supply pressurized fuel from the fuel source to the fuel injectors during continuous operation of the engine; and an auxiliary non-engine driven pump to supply pressurized fuel from the fuel source to the fluid injectors independently of said engine driven pump for providing fuel to the injectors prior to engine starting; said method of operating comprising the following steps:

providing a fuel passage in each fuel injector including a discharge port for injecting pressurized fuel into an associated cylinder;

providing a fuel injection valve in said fuel passage in fluid communication with pressurized fuel adjacent one end and movable between open and closed positions relative to said fuel passage;

providing variable force transmitting means adjacent the other end of said fuel injection valve providing a force opposed to the force of said pressurized fuel;

providing the centralized control means for monitoring predetermined engine conditions and for formulating output signals in response to the monitored engine conditions;

providing output signals from said control means for said pressurized fuel to vary the pressure of said pressurized fuel to a desired amount in accord with said output signals; and providing output signals from said control means for said variable force transmitting means to vary the force transmitted to an amount in accord with said output signals.

66. A method of operation as set forth in claim 65 further including the steps of:

providing an electronically controlled fluid pressure regulator for said pressurized fuel; and sending output signals to said fluid pressure regulator for selectively regulating the pressure of said pressurized fuel.

67. A method of operation as set forth in claim 65 further including the steps of:

providing a pressurized control fluid in fluid communication with the other end of said fuel injection valve thereby defining said variable force transmitting means;

providing an electronically controlled fluid pressure regulator for said pressurized control fluid; and sending output signals to said electronically controlled fluid pressure regulator for selectively regulating the pressure of said pressurized control fluid.

68. A method of operating a fuel injection system for a multi-cylinder internal combustion engine from a centralized control means for recirculating pressurized fuel prior to engine starting, for injecting pressurized fuel during engine starting, and for injecting pressurized fuel intermittently during continuous engine operation after starting; the fuel injection system including a fuel injector for each cylinder, a fuel source, an engine driven pump to supply pressurized fuel from the fuel source to the fuel injectors during continuous operation of the engine, and an auxiliary non-engine driven pump to supply pressurized fuel from the fuel source to the fluid injectors independently of said engine driven pump particularly for recirculation of pressurized fuel during stopping of said engine; said method of operating comprising the following steps:

providing a fuel passage in each injector including a discharge port for injecting pressurized fuel into an associated cylinder;

providing a fuel injection needle valve in said fuel passage in fluid communication adjacent one end with pressurized fluid and movable between open and closed positions relative to said fuel passage;

providing a pressurized fuel recirculation passage from said fuel source through said fluid injectors and return to said fuel source;

recirculating pressurized fuel from said non-engine driven auxiliary fuel pump through said fuel injectors prior to engine starting to effect warming of said fuel injectors; and providing pressurized fuel from said engine driven fuel pump after starting of said engine to provide pressurized fuel to said fuel injectors for injection within said cylinders.

69. The method of operating a fluid injection system as set forth in claim 68 further including the steps of:

providing a variable force transmitting means adjacent the other end of said fuel injection needle valve to provide a force opposed to the force provided by said pressurized fuel;

providing means to change the pressure of said pressurized fuel to a predetermined amount; and providing means to vary the amount of force provided by said variable force means in opposition to the pressure of said pressurized fuel whereby said fuel injection needle valve moves between open and closed positions from predetermined force differentials between the pressurized fuel and said variable force transmitting means.

70. The method of operating a fuel injection system as set forth in claim 69 further including the steps of:

providing monitors for monitoring predetermined engine conditions; and providing output signals in response to said monitors to said variable force means to provide a predetermined force to said variable force means corresponding to said output signals.

71. The method of operating a fuel injection system as set forth in claim 69 further including the steps of:

providing a magnetic material for said fuel injection needle valve;

providing a magnetic coil in each fuel injector about the fuel injector needle valve; and providing means to control said magnetic coil for providing a variable force means for said fuel injection needle valve in opposition to the force provided by said pressurized fuel.

72. The method of operating a fuel injection system as set forth in claim 69 further including the steps of:

providing a control fluid passage in each fuel injector in fluid communication with said other end of said fuel injector needle valve;

providing a pressurized control fluid for said control fluid passage; and providing means to vary the pressure of said pressurized control fluid thereby to provide a variable force transmitting means adjacent the other end of said fuel injector needle valve.

73. A fuel injector for use in a fuel injection system for injection of pressurized fuel intermittently into cylinders of an internal combustion engine, the fuel injector comprising:

a fuel passage in a bore of the fuel injector for receiving pressurized fuel, said fuel passage comprising a discharge port for injecting pressurized fuel into an associated cylinder;

an intermediate control valve mounted in the fuel passage bore, said control valve having opposing first and second ends and movable between open and closed positions relative to an intermediate fuel chamber in fluid communication with the fuel passage; said control valve being normally urged to an open position by pressure of fuel in the passage on the first end of the control valve;

a first magnet for urging the control valve to a closed position relative to the intermediate fuel chamber in the fuel injector bore;

a lower fuel injector valve located in said fuel passage, said valve having opposing first and second ends and being movable between open and closed positions relative to a lower fuel chamber in fluid communication with the fuel passage, said lower fuel injector valve being normally urged to an open position by pressure of fuel in the fuel passage on the first end of said fuel injector valve;

a second magnet in a bore of the lower fuel injector valve, the second magnet urging the fuel injector valve to the closed position;

a passage for magnetic fluid in the injector, the passage having an inlet at one end for fluid supply and another end in fluid communication with the second ends of the injector valve and control valve so that when the magnetic fluid in the passage is subject to magnetic excitation the valves are urged towards closed positions; and means surrounding the intermediate and lower valves for magnetically exciting the magnetic fluid to cause the first and second magnets to urge the valves to closed positions.

74. The fuel injector of claim 73 wherein the fuel injection system comprises means for sensing engine operating conditions and means for controlling engine operating conditions.

75. The fuel injector claim 74 wherein the means for magnetically exciting the magnetic fluid comprises electromagnetic coils excitable in response to a current produced by a signal transmitted by the means for controlling engine operating conditions.

76. The fuel injector of claim 75 wherein the means for sensing comprises a microprocessor receiving operating conditions of the engine as input signals.

77. The fuel injector of claim 75 wherein the means for controlling engine operating conditions comprises a microprocessor transmitting signals to control supply of pressurized fuel to the injector and control magnetic excitation of the electromagnetic coils.

78. The fuel injector of claim 73 wherein the magnetic fluid forms a positive hydraulic seal between injection valves and valve guides for lubricating and centering the valves in the guides.

79. The fuel injector of claim 78 wherein the magnetic fluid comprises an oil with ferromagnetic particles dispersed therein.

* * * * *

UNITED STATES PATENT AND TRADEMARK OFFICE

CERTIFICATE OF CORRECTION

PATENT NO. : 5,235,954

DATED : August 17, 1993

INVENTOR(S) : ANATOLY SVERDLIN

It is certified that error appears in the above-identified patent and that said Letters Patent is hereby corrected as shown below:

In the ABSTRACT, line 11, delete "to" and insert --for--.

Column 5, line 37, delete "4 7,500°Re" and insert --4/7,500°Re--.

Column 7, line 58, delete "flow" and insert --flows--.

Column 11, line 23, delete "pressure current" and insert --pressure-current--.

Signed and Sealed this

Twelfth Day of April, 1994

Attest:

BRUCE LEHMAN

Attesting Officer

Commissioner of Patents and Trademarks